United States Patent
Tamaki (10) Patent No.: US 11,224,026 B2
(45) Date of Patent: Jan. 11, 2022

(54) WIRELESS COMMUNICATION SYSTEM, WIRELESS STATION, AND MOBILE OBJECT INFORMATION SHARING METHOD

(71) Applicant: Hitachi Automotive Systems, Ltd., Hitachinaka (JP)

(72) Inventor: Satoshi Tamaki, Tokyo (JP)

(73) Assignee: Hitachi Astemo, Ltd., Hitachinaka (JP)

(*) Notice: Subject to any disclaimer, the term of this patent is extended or adjusted under 35 U.S.C. 154(b) by 45 days.

(21) Appl. No.: 16/639,455

(22) PCT Filed: Jul. 30, 2018

(86) PCT No.: PCT/JP2018/028374
§ 371 (c)(1),
(2) Date: Feb. 14, 2020

(87) PCT Pub. No.: WO2019/039195
PCT Pub. Date: Feb. 28, 2019

(65) Prior Publication Data
US 2021/0037494 A1   Feb. 4, 2021

(30) Foreign Application Priority Data

Aug. 24, 2017 (JP) .............................. JP2017-160715

(51) Int. Cl.
*H04W 4/00* (2018.01)
*H04W 56/00* (2009.01)
(Continued)

(52) U.S. Cl.
CPC .......... *H04W 56/0045* (2013.01); *H04L 1/08* (2013.01); *H04L 1/22* (2013.01); *H04W 4/46* (2018.02); *H04W 84/005* (2013.01)

(58) Field of Classification Search
None
See application file for complete search history.

(56) References Cited

U.S. PATENT DOCUMENTS 7,085,248 B1* 8/2006 Holma .................. H04B 17/336
370/329
7,679,502 B2* 3/2010 Fukumori ........... B60C 23/0442
340/447

(Continued)

FOREIGN PATENT DOCUMENTS

JP      2003-174395 A      6/2003
JP      2011-229126 A     11/2011
(Continued)

OTHER PUBLICATIONS

International Search Report (PCT/ISA/210) issued in PCT Application No. PCT/JP2018/028374 dated Sep. 18, 2018 with English translation (six pages).

(Continued)

*Primary Examiner* — Elisabeth Benoit Magloire
(74) *Attorney, Agent, or Firm* — Crowell & Moring LLP (57) ABSTRACT

Communication quality such as a delay time is stabilized when a plurality of communication devices on the same mobile object simultaneously perform communication. A wireless communication system that is mounted on a mobile object is a wireless communication system including a first communication device and a second communication device that are mounted on a first mobile object. When information is shared by mobile objects by transmitting packets based on information acquired from a network within the first mobile object to a communication device mounted on a second mobile object, the first communication device and the second communication device transmit packets having the same content by adopting the same communication method and using different channels, and a signal transmission timing from the second communication device is set to be later than a transmission timing from a communication device from the first communication device.

15 Claims, 8 Drawing Sheets

(51) Int. Cl.
*H04W 4/46* (2018.01)
*H04L 1/08* (2006.01)
*H04L 1/22* (2006.01)
*H04W 84/00* (2009.01)

(56) References Cited

U.S. PATENT DOCUMENTS

| | | | |
|---|---|---|---|
| 2004/0240415 A1* | 12/2004 | Lane | H04L 1/0009 370/335 |
| 2004/0253980 A1* | 12/2004 | Lane | H04W 52/343 455/552.1 |
| 2008/0207241 A1* | 8/2008 | Namm | H04W 4/08 455/518 |
| 2008/0220730 A1* | 9/2008 | Borremans | H04H 60/80 455/101 |
| 2011/0063130 A1* | 3/2011 | Ozaki | H04W 72/085 340/905 |
| 2011/0223856 A1* | 9/2011 | Ozaki | H01Q 1/3233 455/11.1 |
| 2011/0255570 A1 | 10/2011 | Fujiwara | |
| 2013/0120159 A1 | 5/2013 | Stahlin et al. | |
| 2017/0359155 A1 | 12/2017 | Harada et al. | |

FOREIGN PATENT DOCUMENTS

| | | |
|---|---|---|
| JP | 2012-239137 A | 12/2012 |
| JP | 2016-136759 A | 7/2016 |
| KR | 10-2013-0096251 A | 8/2013 |
| WO | WO 2016/133185 A1 | 8/2016 |

OTHER PUBLICATIONS

German-language Written Opinion (PCT/ISA/237) issued in PCT Application No. PCT/JP2018/028374 dated Sep. 18, 2018 (five pages).

Korean-language Office Action issued in Korean Application No. 10-2020-7003584 dated Dec. 3, 2020 with English translation (13 pages).

\* cited by examiner

WIRELESS COMMUNICATION SYSTEM, WIRELESS STATION, AND MOBILE OBJECT INFORMATION SHARING METHOD

TECHNICAL FIELD

The present invention relates to a technology for realizing information sharing through communication between mobile objects.

BACKGROUND ART

As transportation systems have advanced, an inter-vehicle communication technology for the purpose of sharing information between vehicles has been developed and adopted. As the information sharing between the vehicles becomes stable with high communication quality such as a low delay and a low error, the information sharing can be applied to a wide range of applications. Therefore, it is important to stabilize communication in inter-vehicle communication.

Although various technologies have been proposed in order to stabilize communication, since it is easy to cope with, for example, the occurrence of sudden changes of a communication environment, and failures of devices, a method of simultaneously performing a plurality of communications is frequently adopted. Meanwhile, when radio resources such as the same or close frequency channels are simultaneously used in a plurality of communications arranged so as to be adjacent to each other, the communications interfere with each other, and thus, the communication quality becomes unstable. Accordingly, collision avoidance of the radio resources is important.

For example, PTL 1 discloses a technology related to a wireless device that transmits a packet signal at a transmission rate different from other communication speeds based on a result of carrier sensing performed over a set waiting time.

CITATION LIST

Patent Literature

PTL 1: JP 2016-136759 A

SUMMARY OF INVENTION

Technical Problem

For example, in the technology disclosed in PTL 1, each communication device such as an in-vehicle terminal performs carrier sensing, and another communication device stops signal transmission of the host communication device during communication. Thus, a plurality of communication devices is prevented from simultaneously using the same radio resources. Meanwhile, when the carrier sensing is performed, there is a problem that a waiting time until the communication can be performed cannot be predicted and a communication delay becomes unstable. Although the carrier sensing is a mechanism when the plurality of communications is originally performed by using the same communication channel, when a plurality of adjacent communication devices performs communication, there is a problem that communication waiting caused by the carrier sensing probabilistically occurs due to influence of a signal that leaks out of a band even though different communication channels are used.

For example, when a plurality of transmitters and receivers are mounted on a vehicle in order to achieve high reliability, a plurality of channels is used as inter-vehicle communication paths, and communication is to be continued even though there is a problem in one channel, it is conceivable that frequencies are changed between channels in order to avoid interference. However, a distance between the receivers mounted on the same vehicle is a considerably short distance. For example, when two receivers are arranged in a width direction of a vehicle, an interval between the receivers has, as an upper limit, a width of the vehicle. The interval between the receivers is about several cm to 350 cm and is within a few meters at most. In the case of the inter-vehicle communication in which vehicles travel in a row, the communication between the front and rear vehicles is a short range communication within a line of sight, and attenuation of a received power is small. Thus, radio waves arrive at receivers other than a communication partner with almost equal power, and large interference between channels is assumed. At this time, when the aforementioned carrier sensing is performed in order to avoid the interference, the communication speed is decreased due to the waiting time. When the delay caused by the carrier sensing is suppressed by sufficiently decreasing a transmission power, there is a problem of a communication delay due to external noise.

In order to solve the aforementioned problems, an object of the present invention is to stabilize communication quality such as a delay time when a plurality of communication devices on the same mobile object simultaneously performs communication.

Solution to Problem

One aspect of the present invention is a wireless communication system that is mounted on a mobile object. The wireless communication system includes a first communication device and a second communication device that are mounted on a first mobile object. When information is shared by mobile objects by transmitting packets based on information acquired from a network within the first mobile object to a communication device mounted on a second mobile object, the first communication device and the second communication device transmit packets having the same content by adopting the same communication method and using different channels, and a signal transmission timing from the second communication device is set to be later than a transmission timing from a communication device from the first communication device.

Another aspect of the present invention is a wireless station that is mounted on a mobile object. The wireless station includes a first communication device and a second communication device. When signals are transmitted to communication devices mounted on a different mobile object, the first communication device and the second communication device transmit the same signals by using different channels from each other, and a signal transmission timing from the second communication device is set to be later than a transmission timing from a communication device from the first communication device.

Still another aspect of the present invention is a mobile object information sharing method of sharing information with another mobile object through wireless communication. The mobile object information sharing method includes setting a transmission timing from a second communication device to be later than a transmission timing from a first communication device when the first communication device and the second communication device mounted on a first mobile object and a third communication device and a fourth communication device mounted on a second mobile object are used and the same transmission signals are transmitted to the third communication device and the fourth communication device from the first communication device and the second communication device by using different channels.

Advantageous Effects of Invention

According to the present invention, when several communication devices on the same mobile object communicate simultaneously, communication quality, such as delay time, can be stabilized.

DESCRIPTION OF EMBODIMENTS

Hereinafter, embodiments of the present invention will be described with reference to the drawings. In a configuration of the invention to be described below, the same portions or portions having similar functions share the same reference signs in different drawings, and redundant descriptions may be omitted. When there is a plurality of components having the same or similar functions, the same reference signs may be given with different subscripts. In this case, when there is no need to distinguish between the plurality of components, the description may be made while the subscripts are omitted.

Notations such as "first", "second", and "third" in the present specification are given to identify the components, and do not necessarily limit the number, order, or contents thereof. The numbers for identifying components are used for each context, and a number used in one context does not necessarily indicate the same configuration in another context. A component identified by a certain number is not hindered from also functioning as a component identified by another number.

In one of the embodiments to be described below, an example in which a wireless communication system includes a first communication device and a second communication device, and when signals are transmitted to the communication devices provided at different mobile objects, the first communication device and the second communication device transmit the same signals by using different channels, and a signal transmission timing from the second communication device is set to be later than a transmission timing from the communication device from the first communication device will be described.

First Embodiment

Figure 1A:
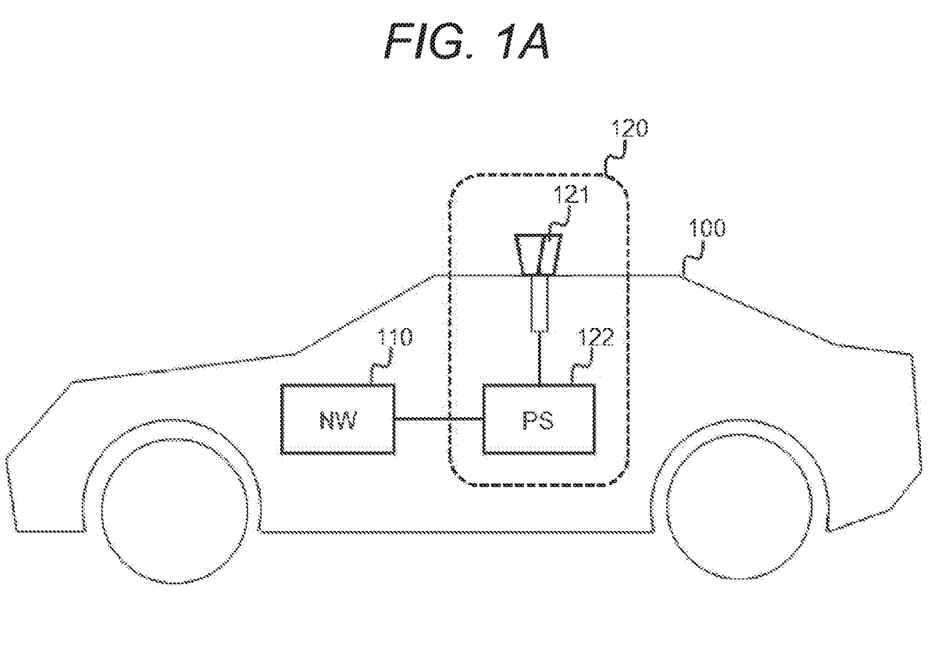
FIG. 1A is a configuration diagram of a mobile object that adopts a wireless communication system according to an embodiment of the present invention.

FIG. 1A is a configuration diagram of a mobile object that adopts the wireless communication system according to the embodiment of the present invention. For example, in the configuration example illustrated in FIG. 1A, an in-vehicle network (NW) 110 and an inter-vehicle communication unit 120 are included in a mobile object 100 such as a vehicle. The in-vehicle network 110 is a network that communicates various types of information including control information between devices in the mobile object 100. For example, a Controller Area Network (CAN) or FlexRay (trademark) is adopted as the in-vehicle network 110. The inter-vehicle communication unit 120 transmits information on the in-vehicle network 110 in the host mobile object 100 to another mobile object 100, receives a signal transmitted from the inter-vehicle communication unit 120 in another mobile object 100, and disseminates the information on the in-vehicle network 110 in the host mobile object 100.

The inter-vehicle communication unit 120 includes an inter-vehicle communication processing unit (PS) 122 and a plurality of inter-vehicle communication transmitting and receiving units 121. The inter-vehicle communication processing unit 122 is connected to the in-vehicle network 110. The inter-vehicle communication processing unit 122 receives information from the in-vehicle network 110, converts a format of the information for inter-vehicle communication, and transmits the information to the inter-vehicle communication transmitting and receiving unit 121. The inter-vehicle communication processing unit 122 converts information received from the inter-vehicle communication transmitting and receiving unit 121 from the information format for inter-vehicle communication into an information format for the in-vehicle network, and transmits necessary information to the in-vehicle network 110. The inter-vehicle communication transmitting and receiving unit 121 includes an antenna, and transmits, as a wireless signal, information received from the inter-vehicle communication processing unit 122. The inter-vehicle communication transmitting and receiving unit 121 transmits information obtained by receiving the wireless signal to the inter-vehicle communication processing unit 122.

The method of the inter-vehicle communication used in the inter-vehicle communication unit 120 may be, for example, a wireless local area network (LAN), may be a wireless personal area network (PAN), or may be any other method such as a dedicated short range communications (DSRC).

As for the separation of functions for communication in the inter-vehicle communication unit 120, for example, the inter-vehicle communication processing unit 122 and the inter-vehicle communication transmitting and receiving unit 121 may be connected by wired LAN, and conversion between wired LAN signals and wireless signals of the wireless LAN, amplification of the wireless signals, and transmission and reception of the signals through the antenna may be performed in the inter-vehicle communication transmitting and receiving unit 121. Alternatively, the inter-vehicle communication processing unit 122 may perform wireless signal processing of a baseband frequency band of the wireless LAN, and the inter-vehicle communication transmitting and receiving unit 121 may perform frequency conversion of the wireless signal between the baseband frequency band and a radio frequency band, and may perform the amplification of the wireless signal and the transmission and reception of the signals through the antenna. Alternatively, the inter-vehicle communication transmitting and receiving unit 121 may perform only the amplification of the wireless signals and the transmission and reception of the signal through the antenna, and other functions may be performed by the inter-vehicle communication processing unit 122. Alternatively, the inter-vehicle communication transmitting and receiving unit 121 may perform only the signal transmission and reception using the antenna, and other functions including the amplification of the wireless signals may be performed by the inter-vehicle communication processing unit 122.

Figure 1B:
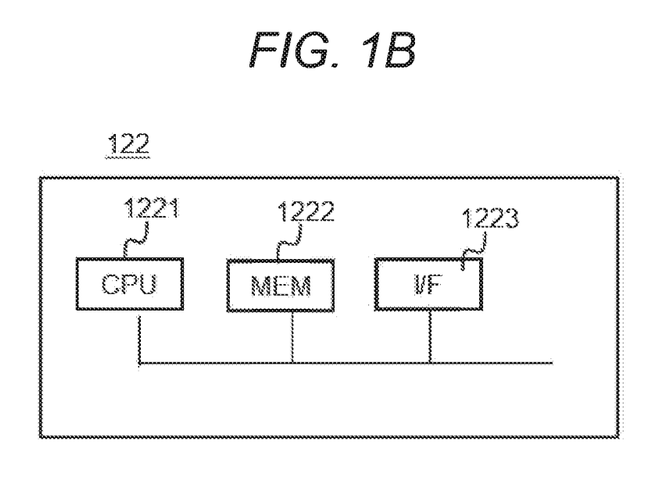
FIG. 1B is a configuration block diagram of the wireless communication system according to the embodiment of the present invention.

FIG. 1B is a configuration block diagram illustrating the inter-vehicle communication processing unit 122. The inter-vehicle communication processing unit 122 can be a microcomputer that includes a processor (CPU) 1221, a memory (MEM) 1222, and an input and output interface (I/F) 1223. In the present embodiment, functions such as calculation, processing, and control are realized by a program stored in the memory 1222 being executed by the processor 1221, and thus, predetermined processing is performed in cooperation with other hardware. A program executed by a computer, a function thereof, or means for realizing this function may be referred to as a "function", "means", a "part", a "unit", or a "module". The input and output interface (I/F) 1223 includes hardware for exchanging data with the inter-vehicle communication transmitting and receiving unit 121 and the in-vehicle network 110. The input and output interface (I/F) 1223 can be connected to various known input and output devices such as a display and a keyboard (not illustrated).

Figure 1C:
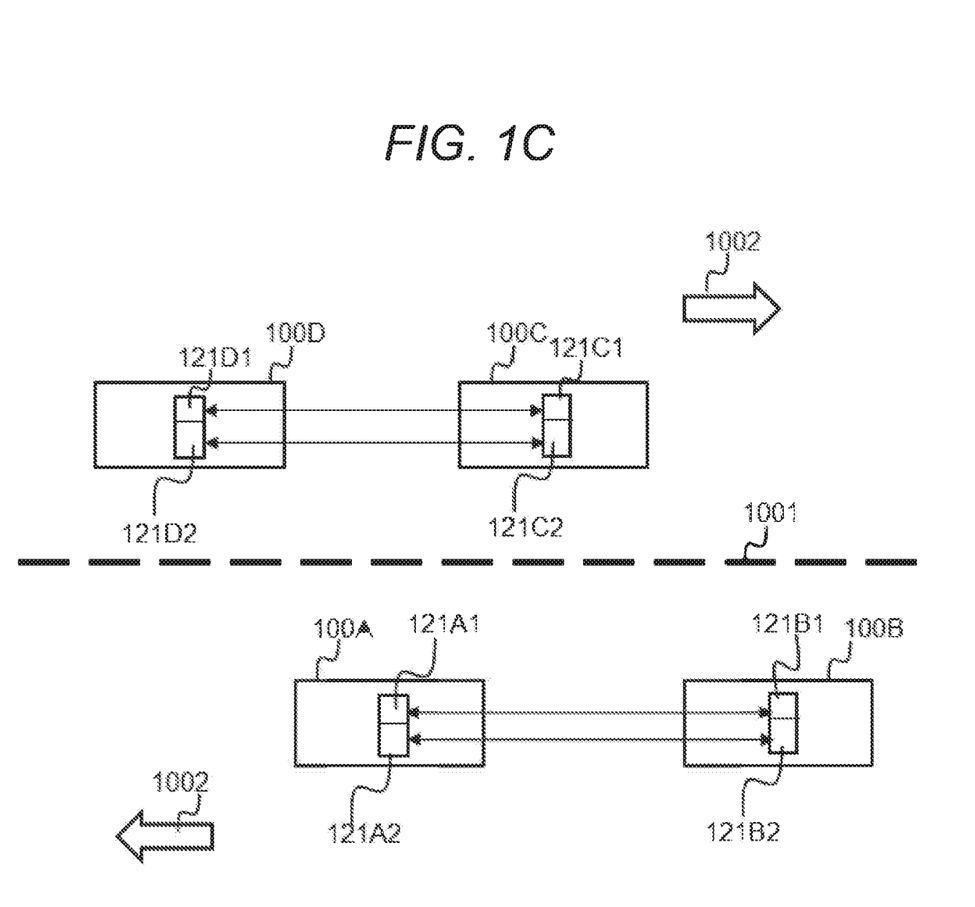
FIG. 1C is a configuration diagram of an inter-vehicle communication system that adopts the wireless communication system according to the embodiment of the present invention.

FIG. 1C illustrates an example in which a vehicle is used as the mobile object 100 illustrated in FIG. 1A, and illustrates, for example, a scene in which vehicles 100A and 100B on a highway perform a following operation. For example, it is assumed that the mobile objects 100 are traveling in a direction of an arrow 1002 on both sides of a median strip 1001.

The vehicles 100A and 100B on one lane share a vehicle control CAN signal between the vehicles via wireless communication using the inter-vehicle communication transmitting and receiving unit 121. At this time, the vehicle 100A and the vehicle 100B include, respectively, inter-vehicle communication transmitting and receiving units 121A1 and 121A2 and inter-vehicle communication transmitting and receiving units 121B1 and 121B2 in parallel in width directions of the vehicles. At this time, the width of the vehicle is an upper limit of an interval between the inter-vehicle communication transmitting and receiving units 121.

In the inter-vehicle communication, the inter-vehicle communication transmitting and receiving units 121A1 and 121B1 perform communication on a first channel, and the inter-vehicle communication transmitting and receiving units 121A2 and 121B2 perform communication on a second channel. In the present embodiment, since the communication between the vehicles is assumed, it is preferable that a transmitter of the inter-vehicle communication transmitting and receiving unit 121 has directivity to the rear (or front) of the vehicle and a receiver thereof has directivity to the front (or rear) of the vehicle. A plurality of transmitters is arranged in parallel in, for example, a vehicle width direction, and a plurality of receivers is arranged in parallel in, for example, the vehicle width direction. For example, when it is assumed that a plurality of vehicles automatically travels in a row, a communication distance of the first and second channels may be about a distance between the vehicles during traveling, and a short range wireless communication system such as wireless LAN, wireless PAN, and DSRC may be adopted.

For example, when the rear vehicle 100B can share a CAN signal indicating the braking of the front vehicle 100A, it is possible to detect a change in a front environment (for example, the presence of an obstacle on a road) in advance, and the rear vehicle 100B can cope with the change of the front environment in advance. At this time, when a plurality of inter-vehicle communication channels is used as illustrated in FIG. 1C in order to achieve high reliability, communication can be continued even if there is a problem in one system. Note that, although FIG. 1C shows an example of inter-vehicle communication between two front and rear vehicles, it is equally possible for three or more vehicles including a similar communication system to share information in a relay format.

Figure 2:
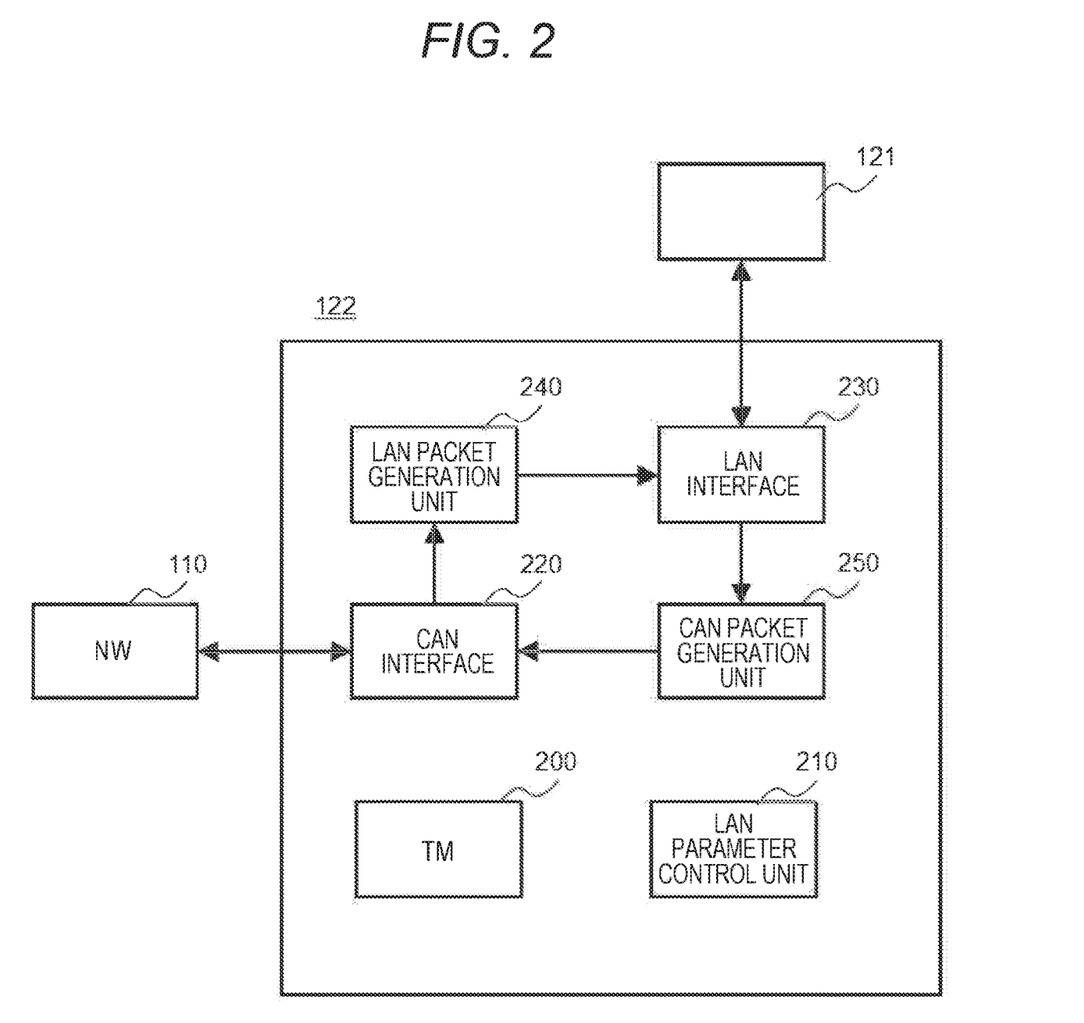
FIG. 2 is a configuration diagram of an inter-vehicle communication processing unit according to the embodiment of the present invention.

FIG. 2 is a functional configuration diagram of the inter-vehicle communication processing unit 122 according to the embodiment of the present invention. This function is realized by the microcomputer illustrated in FIG. 1B described above. In the present embodiment, an example in which the inter-vehicle communication processing unit 122 is connected to the in-vehicle network 110 via the CAN and is connected to the inter-vehicle communication transmitting and receiving unit 121 that performs transmission and reception using wireless LAN via wired LAN is illustrated. The inter-vehicle communication processing unit 122 of the present example includes a timer (TM) 200, a LAN parameter control unit 210, a CAN interface 220, a LAN interface 230, a LAN packet generation unit 240, and a CAN packet generation unit 250.

The timer 200 has a clock therein, controls an operation timing of each part in the inter-vehicle communication processing unit 122 based on a clock timing and event information notified from each part, and notifies each part of an operation start trigger. The LAN parameter control unit 210 sets parameters for adjusting communication, for example, a transmission power, a transmission bandwidth, and a transmission channel for the inter-vehicle communication transmitting and receiving unit 121 and the inter-vehicle communication processing unit 122.

The CAN interface 220 receives the CAN signal from the in-vehicle network 110, accumulates the received information, and notifies the timer 200 of a CAN signal reception event. The CAN interface 220 also converts CAN transmission information received from the CAN packet generation unit 250 into a CAN signal, and transmits the converted CAN signal to the in-vehicle network 110.

The LAN interface 230 receives the LAN signals from the plurality of inter-vehicle communication transmitting and receiving units 121, accumulates the received information, and notifies the timer 200 of a LAN signal reception event. When the received information is accumulated, header information such as a sequence number may be confirmed, and when it is determined that the same LAN signal has already been received and accumulated, the received signal may be discarded. When it is determined that the same LAN signal has already been received and accumulated, the accumulated signal is compared with the received signal, the matching part may be discarded, and a plurality of pieces of information may be accumulated based on the mismatching part. The notification of the LAN signal reception event may be performed whenever the LAN signal is received, or may not be performed when it is determined that the same LAN signal has already been received and accumulated. The LAN interface 230 converts the LAN transmission information received from the LAN packet generation unit 240 into the LAN signal, and transmits the LAN signal to the plurality of inter-vehicle communication transmitting and receiving units 121.

The LAN packet generation unit 240 receives the operation start trigger from the timer 200 periodically or based on the CAN signal reception event, acquires the information stored in the CAN interface 220, generates the LAN signal based on the acquired information, and transmit the generated LAN signal to the LAN interface 230.

The CAN packet generation unit 250 receives the operation start trigger from the timer 200 periodically or based on the LAN signal reception event, acquires the information stored in the LAN interface 230, generates the CAN signal based on the acquired information, and transmits the generated CAN signal to CAN interface 220. When the plurality of pieces of information based on the same LAN signals are stored in the LAN interface 230, only one piece of information is selected from the plurality of pieces of information, and the CAN signal is generated. As a method of selecting only one piece of information, for example, when three or more pieces of information are stored and two or more pieces of information match, the pieces of information having a larger number of matches may be selected. Alternatively, the information that was earliest to be stored in the LAN interface 230 may be selected. Alternatively, the information that was latest to be stored in the LAN interface 230 may be selected, or selection may be performed randomly.

Figure 3:
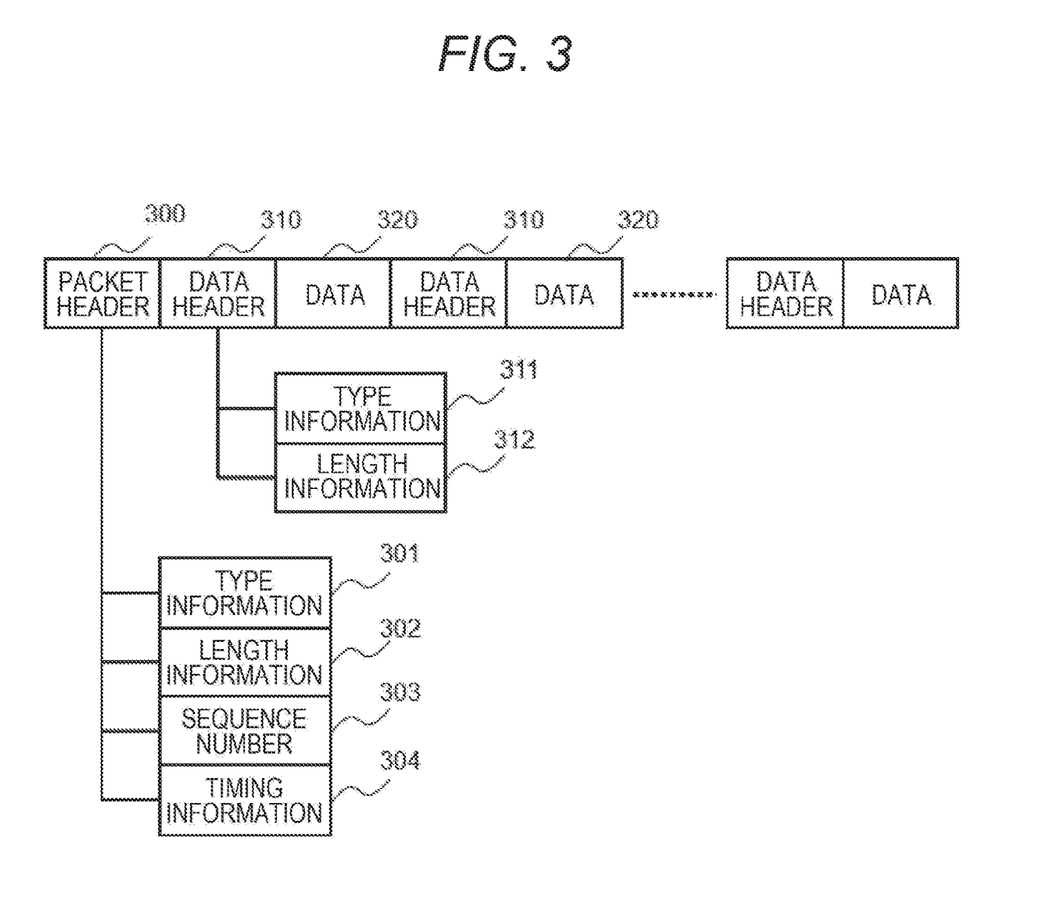
FIG. 3 is an example of LAN transmission information generated by a LAN packet generation unit according to the embodiment of the present invention.

FIG. 3 is an example of the LAN transmission information (LAN packet) which is generated by the LAN packet generation unit 240 of the embodiment of the present invention or is received by the inter-vehicle communication transmitting and receiving unit 121. The LAN transmission information includes a LAN packet header 300, one or a plurality of LAN data headers 310, and one or a plurality of LAN data 320.

The LAN packet header 300 includes a part or all of packet type information 301, packet length information 302, sequence number information 303, and timing information 304. The LAN data header 310 includes a part or all of data type information 311 and data length information 312. The LAN data 320 includes the information accumulated in the CAN interface 220, and the type of the information is described in the data type information 311 of the LAN data header 310. The information accumulated in the CAN interface 220 included in the LAN data 320 is, for example, information related to motion of the mobile object 100 such as speed information and acceleration information, information related to motion control such as an accelerator and a brake of the mobile object 100, a combination thereof, or other information.

Figure 4:
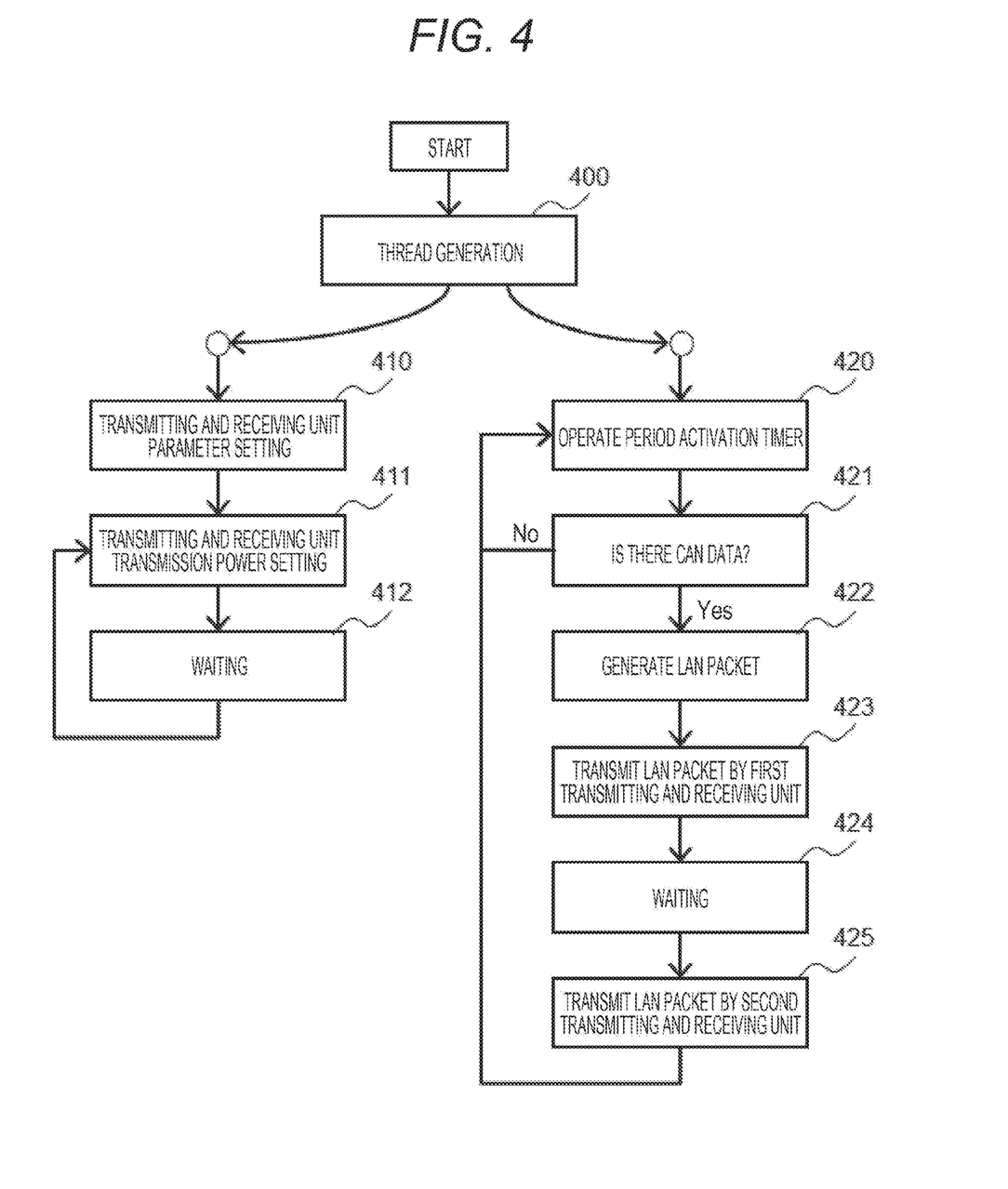
FIG. 4 is an example of a processing flow related to LAN packet generation in the inter-vehicle communication processing unit according to the embodiment of the present invention.

FIG. 4 is an example of a processing flow related to LAN packet generation in the inter-vehicle communication processing unit 122 according to the embodiment of the present invention. Here, although the processing flow is illustrated on the assumption that two inter-vehicle communication transmitting and receiving units 121 that are respectively numbered 1 and 2 are used, a similar processing flow can be realized in a case where the number of inter-vehicle communication transmitting and receiving units 121 is three or more. After the processing is started, a thread related to the LAN parameter control unit 210 and a thread related to the CAN interface 220, the LAN packet generation unit 240, and the LAN interface 230 are generated in processing 400.

In the former thread, the LAN parameter controller 210 sets parameters related to the inter-vehicle communication transmitting and receiving units 121 in processing 410. Here, different channels are set for the plurality of inter-vehicle communication transmitting and receiving units 121, respectively. Here, different frequencies are allocated. Subsequently, in processing 411, the LAN parameter control unit 210 sets transmission powers for the plurality of inter-vehicle communication transmitting and receiving units 121. Here, the LAN parameter control unit 210 sets the transmission powers for the plurality of inter-vehicle communication transmitting and receiving units 121 such that the transmission powers become lower or equal as the numbers of the inter-vehicle communication transmitting and receiving units 121 become smaller in ascending order, for example.

Subsequently, the processing is temporarily stopped in processing 412, and processing 411 is performed again after a predetermined time elapses or after any event occurs. When processing 411 is performed again, for example, based on communication quality estimated from a communication delay time and a communication error rate, the power set for each of the inter-vehicle communication transmitting and receiving units 121 is reduced when the communication quality is sufficiently high, and the power set for each of the inter-vehicle communication transmitting and receiving 121 is increased when the communication quality is lower than a predetermined level. Here, a case where the communication quality is high means that for example, there are few communication errors occurring in a predetermined time range, means that for example, an average communication delay is short, means that, for example, a dispersion of the communication delay is small, means that, for example, an occurrence probability of the communication delay of a predetermined level or more is low, and means that for example, a rank value such as a maximum value or 95% value of the communication delay within a predetermined time range is small. When a state in which the communication quality is low continues, the transmission may be temporarily stopped, and an inter-vehicle communication abnormality may be notified to the in-vehicle network 110.

In the latter thread, first, a period activation timer is operated in processing 420, and the processing proceeds to processing 421 at regular intervals, for example, every 1 ms. In processing 421, it is confirmed whether or not CAN data is accumulated in the CAN interface 220. The processing proceeds to processing 422 when the CAN data is accumulated, and the processing returns to processing 420 when the CAN data is not accumulated. In processing 422, the LAN transmission information of FIG. 3 is generated by using a part or all of the accumulated CAN data. Subsequently, in processing 423, the LAN transmission information generated in processing 422 is transmitted via the inter-vehicle communication transmitting and receiving unit 121 having the smaller number (for example, number 1) of the inter-vehicle communication transmitting and receiving units 121. Subsequently, in processing 424, short-term processing such as 0.2 ms is stopped. Subsequently, in processing 425, the LAN transmission information generated in processing 422 is transmitted via the inter-vehicle communication transmitting and receiving unit 121 having the larger number (for example, number 2) than the inter-vehicle communication transmitting and receiving unit 121 used in processing 423, and the processing is completed and returns to processing 420.

Through the aforementioned processing flow, the same information is transmitted from the plurality of inter-vehicle communication transmitting and receiving units 121 at different timings by using a higher transmission power of the inter-vehicle communication transmitting and receiving unit 121 that transmits the information later than the inter-vehicle communication transmitting and receiving unit 121 that transmits the information earlier. Accordingly, when the plurality of inter-vehicle communication transmitting and receiving units 121 perform communication on different channels, it is possible to reduce the occurrence probability of communication collision and the occurrence of communication waiting caused by carrier sensing due to the influence of out-of-channel leakage. Since the transmission power of the inter-vehicle communication transmitting and receiving unit 121 that transmits the information later is high, even if there is an unarrived packet in the inter-vehicle communication transmitting and receiving unit 121 that transmits the information earlier, an arrival probability of the packet transmitted later becomes higher. Accordingly, it is possible to reduce a probability that the delay time is a predetermined level or more.

Figure 5:
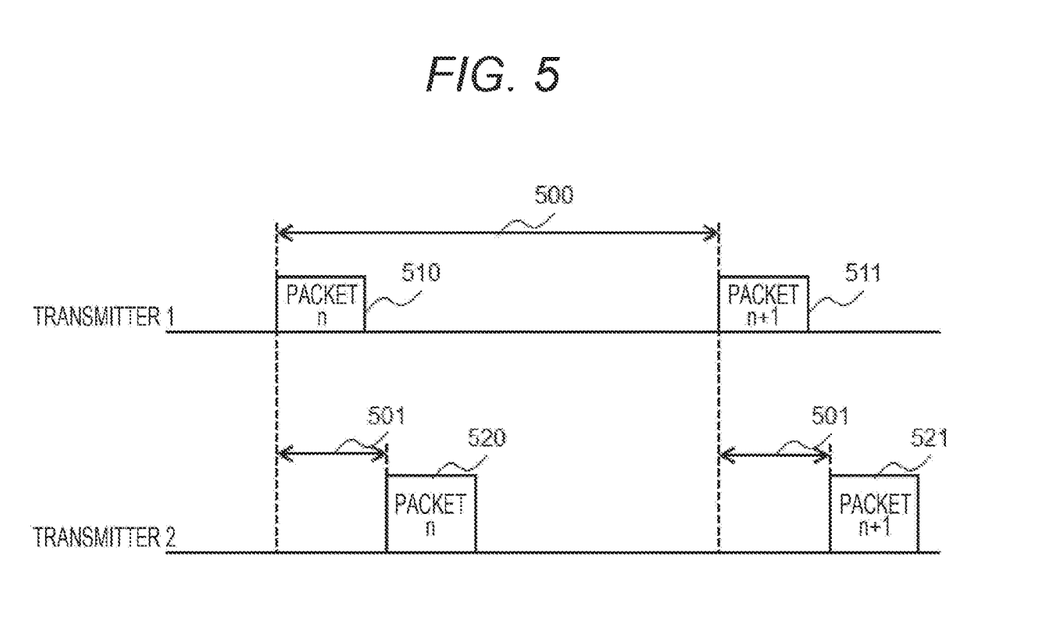
FIG. 5 is a schematic diagram of signals transmitted from an inter-vehicle communication transmitting and receiving unit according to the embodiment of the present invention.

FIG. 5 is a schematic diagram of the signals transmitted from the inter-vehicle communication transmitting and receiving units 121 according to the embodiment of the present invention. The processing according to the flow of FIG. 4 is performed, and thus, the signals illustrated in the schematic diagram of FIG. 5 are transmitted from the inter-vehicle communication transmitting and receiving units 121, and can be confirmed by using, for example, a measurement device such as a high-band receiver. When two inter-vehicle communication transmitting and receiving units 121 are provided, the packets are transmitted from each of the inter-vehicle communication transmitting and receiving units 121 at an interval 500 corresponding to, for example, 1 ms. The packets are transmitted with the transmission power higher than or equal to the transmission power of the first inter-vehicle communication transmitting and receiving unit 121 from the second inter-vehicle communication transmitting and receiving unit 121 after the packets are transmitted from the first inter-vehicle communication transmitting and receiving unit 121, for example, after an interval 501 corresponding to 0.2 ms elapses.

The interval 501 serving as an offset needs to be shorter than the interval 500, but the offset is desirably small since a data delay is caused by the offset. Here, packets 520 and 521 from the second inter-vehicle communication transmitting and receiving unit 121 transmitted after the interval 501 are likely to be interfered when the timings of preceding packets 510 and 511 are delayed. Thus, the interval 501 is desirably set to a length capable of covering the variation of the delay.

As described above, the transmission powers set for the plurality of inter-vehicle communication transmitting and receiving units 121 are set such that the transmission power of the inter-vehicle communication transmitting and receiving unit 121 that transmits the packet later in time is equal to or higher than the transmission power of the inter-vehicle communication transmitting and receiving unit 121 that transmits the packet earlier in time, and thus, the interference is reduced. The reception reliability of the packets 520 and 521 is higher than the reception reliability of the preceding packets 510 and 511. When the information cannot be reliably received by subsequent packets 520 and 521, since accurate information cannot be resultingly received, the reliability of the subsequent packets is preferably improved.

The interval 501 can be controlled according to a communication environment. For example, the variation of the communication delay is measured, and the interval 501 can be increased when the delay variation is large, and the interval 501 can be decreased when the delay variation is small. Here, a case where the variation of the delay is large may refer to, for example, a case where the dispersion of the measured communication delay is large, or may refer to a case where the rank value such as the maximum value of the communication delay and 95% value within a predetermined time range is large.

Second Embodiment

Figure 6:
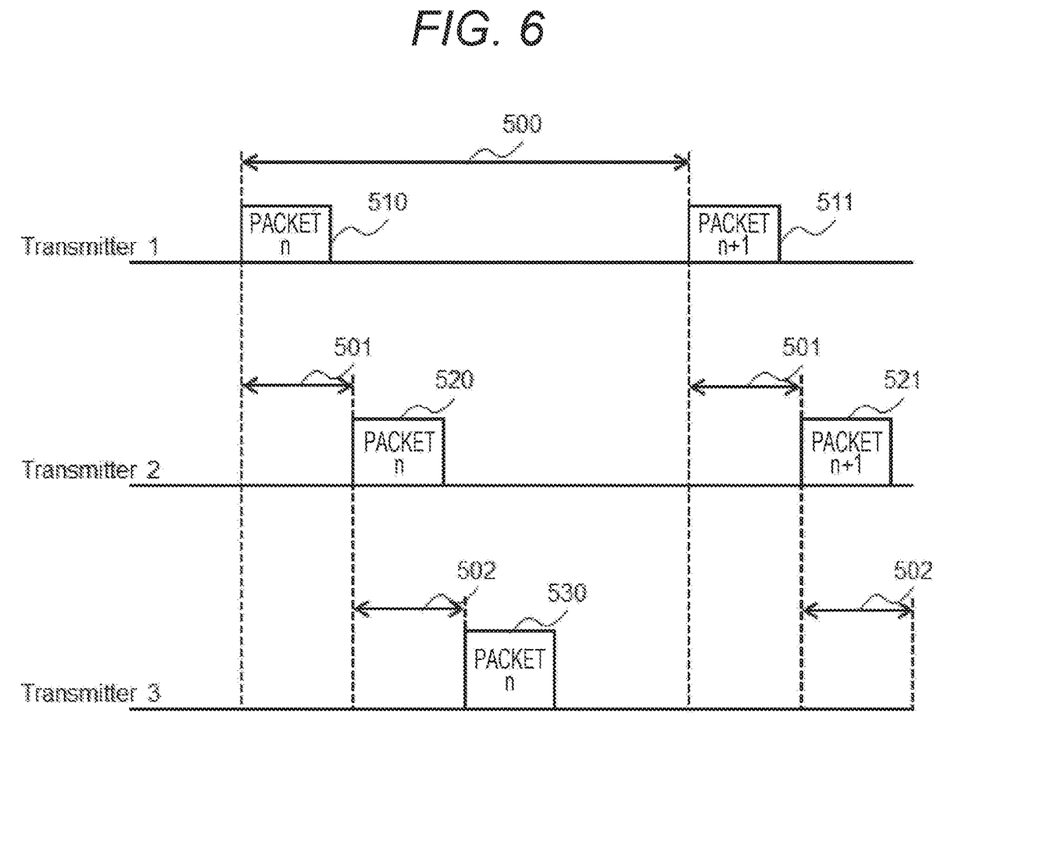
FIG. 6 is a schematic diagram of signals transmitted from an inter-vehicle communication transmitting and receiving unit according to another embodiment of the present invention.

FIG. 6 is a schematic diagram of the signals transmitted from the inter-vehicle communication transmitting and receiving units 121 according to another embodiment of the present invention. This example is an example in which three inter-vehicle communication transmitting and receiving units 121 are provided, and the case of four or more can be similarly expanded. That is, each inter-vehicle communication transmitting and receiving unit 121 transmits the packets every interval 500 corresponding to, for example, 1 ms. The packets are transmitted with the transmission power higher than or equal to the transmission power of the first inter-vehicle communication transmitting and receiving unit 121 from the second inter-vehicle communication transmitting and receiving unit 121 after the packets are transmitted from the first inter-vehicle communication transmitting and receiving unit 121, for example, after an interval 501 corresponding to 0.2 ms elapses. The packets are transmitted with the transmission power higher than or equal to the transmission power of the second inter-vehicle communication transmitting and receiving unit 121 from the third inter-vehicle communication transmitting and receiving unit 121 after the packets are transmitted from the second inter-vehicle communication transmitting and receiving unit 121, for example, after an interval 502 corresponding to 0.2 ms elapses.

The interval 501 and the interval 502 can be controlled according to the communication environment. For example, the variation of the communication delay is measured, and the interval 501 and the interval 502 can be increased when the delay variation is large, and the interval 501 and the interval 502 can be decreased when the delay variation is small.

Third Embodiment

Figure 7:
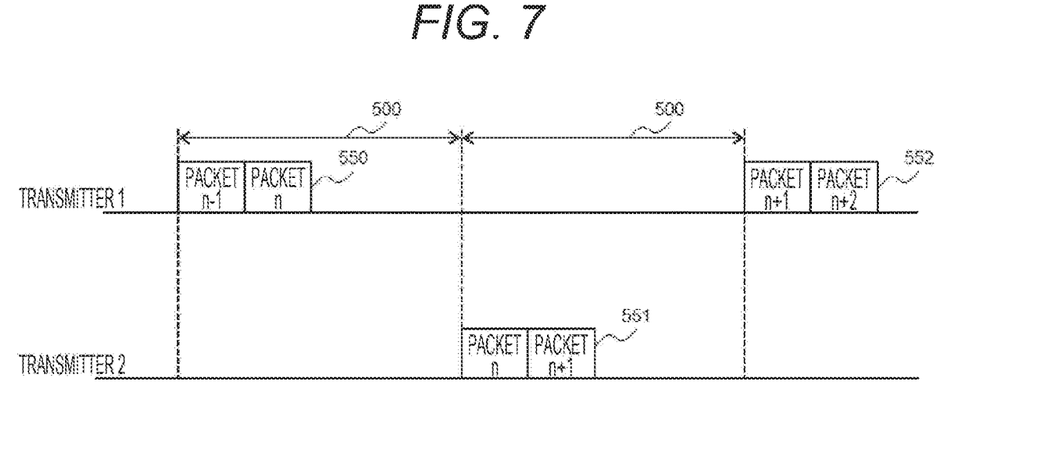
FIG. 7 is a schematic diagram of signals transmitted from an inter-vehicle communication transmitting and receiving unit of still another embodiment of the present invention.

FIG. 7 is a schematic diagram of the signals transmitted from the inter-vehicle communication transmitting and receiving units 121 according to still another embodiment of the present invention. The present diagram is an example in which two inter-vehicle communication transmitting and receiving units 121 are provided. At a transmission timing n, information corresponding to two packets of an (n−1)-th packet and an n-th packet is transmitted from the first inter-vehicle communication transmitting and receiving unit 121. Subsequently, for example, after the interval 500 corresponding to 1 ms elapses, information corresponding to two packets of the n-th packet and an (n+1)-th packet is transmitted from the second inter-vehicle communication transmitting and receiving unit 121. Subsequently, for example, after the interval 500 corresponding to 1 ms elapses, information corresponding to the (n+1)-th packet and an (n+2)-th packet is transmitted from the first inter-vehicle communication transmitting and receiving unit 121.

In the method of FIG. 7, since a transmission interval of the packet is longer than that of the method of FIG. 5, even when communication delay is increased or is varied, a probability that inter-vehicle communication transmitting and receiving units will interfere with each other is decreased.

The method illustrated in FIGS. 5 and 6 and the method illustrated in FIG. 7 can be switched according to the communication environment. For example, when two inter-vehicle communication transmitting and receiving units 121 are provided, the variation of the communication delay is measured. When the variation of the delay is large, the transmission is performed according to the method of FIG. 7, and when the variation of the delay is small, the transmission is performed according to the method of FIG. 5.

Figure 8A:
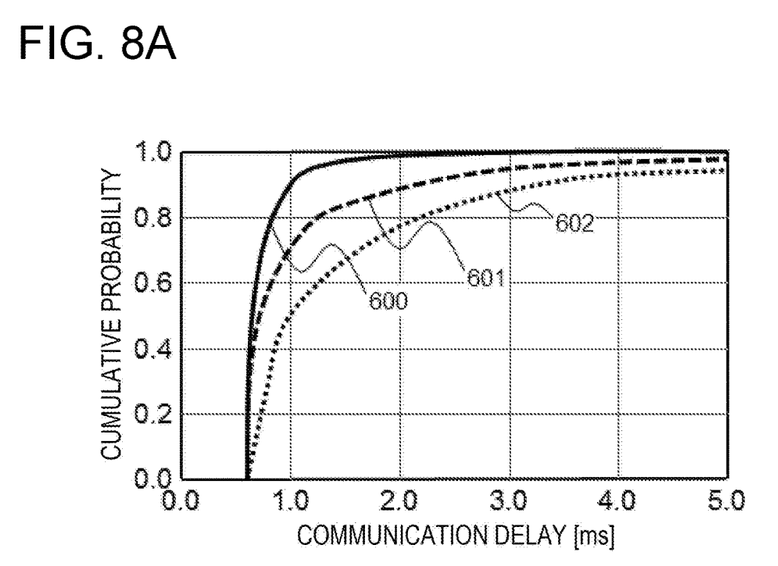
FIGS. 8A and 8B are graphs illustrating the effects of the embodiment of the present invention.
Figure 8B:
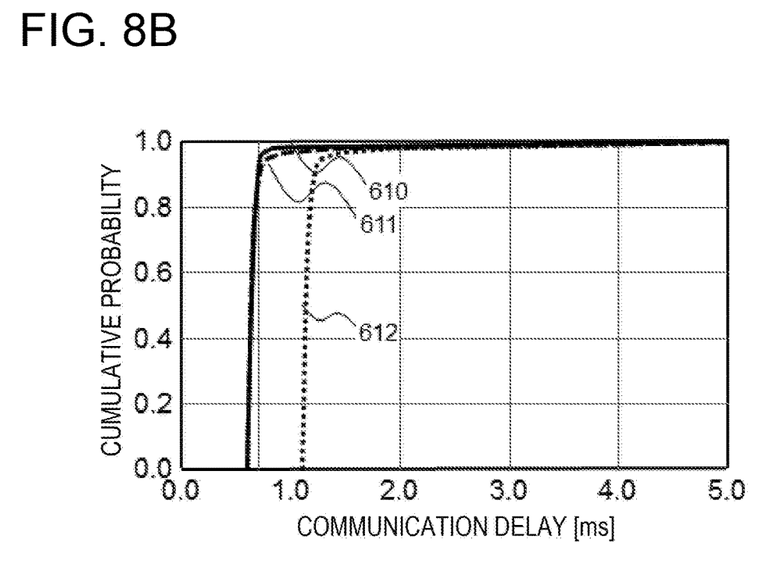

FIG. 8 illustrates graphs illustrating the effects of the embodiment. FIG. 8(*a*) illustrates a cumulative probability distribution of the communication delays when the inter-vehicle communication unit 120 includes two inter-vehicle communication transmitting and receiving units 121 and the present embodiment is not applied. That is, in the example of FIG. 8(*a*), the two inter-vehicle communication transmitting and receiving units 121 of the inter-vehicle communication unit 120 simultaneously transmit the same packets with the same power. FIG. 8(*b*) illustrates a cumulative probability distribution of the communication delays when the inter-vehicle communication unit 120 includes two inter-vehicle communication transmitting and receiving units 121 and the present embodiment is applied. That is, in the example of FIG. 8(*b*), the two inter-vehicle communication transmitting and receiving units 121 of the inter-vehicle communication unit 120 transmit the same packets with an offset in time, and increase the transmission powers of the subsequent packets.

In FIGS. 8(*a*) and 8(*b*), a broken line 601 and a broken line 611 are cumulative probability distributions of the communication delays using one of the two inter-vehicle communication transmitting and receiving units 121, and a dotted line 602 and a dotted line 612 are cumulative probability distributions of the communication delays using the other communication transmitting and receiving unit 121. A solid line 600 and a solid line 610 are cumulative probability distributions of the communication delays when a packet having a short delay is selected from among the communications using the two inter-vehicle communication transmitting and receiving units 121 for each packet.

As described above, for example, when communication for transmitting the same packets is performed by using two inter-vehicle communication transmitting and receiving unit 121 that adopt short range wireless communication such as wireless LAN, since each communication interferes with another communication, communication waiting probabilistically occurs. That is, when the wireless method is to perform carrier sensing in which the other communication device is waiting for transmission while one communication device is communicating, a communication delay due to a waiting time occurs. When the carrier sensing is not performed, a packet error rate is increased due to interference, and a probability that retransmission will be necessary is increased. Thus, as illustrated in FIG. 8(*a*), a large delay probabilistically occurs in each communication, and the delay is probabilistically increased even in the solid line 600 in which the packet having the short delay is selected. Thus, even though there is an attempt to reduce the delay by increasing the arrival probability of the packets by multiplexing channels, the expected effect cannot be obtained.

Meanwhile, the present embodiment is applied, and thus, there is an offset time between the transmission from one inter-vehicle communication transmitting and receiving unit 121 and the transmission from the other inter-vehicle communication transmitting and receiving unit 121. Thus, as illustrated in FIG. 8(*b*), for example, since the transmission from the inter-vehicle communication transmitting and receiving unit 121 corresponding to the dotted line 612 is constantly delayed by the offset time or more but a probability that each communication will interfere with another communication is decreased, when the packet having the small delay of the solid line 610 is selected, a probability that a large delay will occur is considerably smaller than that when the present embodiment is not applied.

The present invention is not limited to the aforementioned embodiments, and includes various modification examples and equivalent configurations within the gist of the appended claims. For example, the aforementioned embodiments are described in detail in order to facilitate easy understanding of the present invention, and the present invention is not limited to necessarily include all the described components. A part of the configuration of one embodiment may be replaced with the configuration of another embodiment. The configuration of another embodiment may be added to the configuration of one embodiment. Another configuration may be added, removed, and substituted to, from, and into some of the configurations of the aforementioned embodiments.

A part or all of the aforementioned configurations, functions, processing units, and processing means may be realized by hardware by being designed with, for example, an integrated circuit. Alternatively, the processor illustrated in FIG. 1B interprets and executes a program for realizing the functions, and thus, a part or all of the aforementioned configurations, functions, processing units, and processing means may be realized by software. When there is a plurality of functions that is the same in configuration, the hardware or the software for realizing the functions may be separately implemented, or a plurality of processing may be performed by using the implemented one hardware or software in a time multiplexed manner. Even when there is a plurality of functions that is the same in configuration, distribution processing may be performed by using a plurality of hardware or software having the same function.

Information of programs, tables, and files for realizing the functions can be stored in a storage device such as a memory, a hard disk, or a solid state drive (SSD), or a recording medium such as an IC card, an SD card, or a DVD.

Control lines and information lines illustrate lines which are considered to be necessary for the description, and not all the control lines and information lines necessary in the implementation are necessarily illustrated. Almost all the configurations may be considered to be actually connected to each other.

According to the present embodiment, it is possible to provide a wireless communication system and a wireless station device that stabilize communication quality such as a delay time, and it is possible to provide information sharing of mobile objects that adopt the wireless communication system.

INDUSTRIAL APPLICABILITY

The present invention can be used for communication technology between mobile objects.

REFERENCE SIGNS LIST 100 mobile object
110 in-vehicle network (NW)
120 inter-vehicle communication unit

The invention claimed is:

1. A wireless communication system that is mounted on a mobile object, the system comprising:
   a first communication device and a second communication device that are mounted on a first mobile object,
   wherein, when information is shared by mobile objects by transmitting packets based on information acquired from a network within the first mobile object to a communication device mounted on a second mobile object,
   the first communication device and the second communication device transmit packets having the same content by adopting the same communication method and using different channels, and
   a signal transmission timing from the second communication device is set to be later than a transmission timing from a communication device from the first communication device.

2. The wireless communication system according to claim 1,
   wherein a transmission power from the second communication device is set to be higher than a transmission power from the first communication device.

3. The wireless communication system according to claim 1,
   wherein the second moving object includes a third communication device and a fourth communication device,
   when the packets from the first communication device and the second communication device are transmitted to the third communication device and the fourth communication device,
   the same packets are transmitted by using different channels by forming a first channel between the first communication device and the third communication device and forming a second channel between the second communication device and the third communication device, and
   information to be transmitted to a network within the second mobile object is constituted by using a packet having a short delay among the same packets obtained from different channels in the second mobile object.

4. A wireless station that is mounted on a mobile object, the wireless station comprising:
   a first communication device and a second communication device,
   wherein, when signals are transmitted to communication devices mounted on a different mobile object,
   the first communication device and the second communication device transmit the same signals by using different channels from each other, and
   a signal transmission timing from the second communication device is set to be later than a transmission timing from a communication device from the first communication device.

5. The wireless station according to claim 4,
   wherein a transmission power from the second communication device is set to be higher than a transmission power from the first communication device.

6. The wireless station according to claim 4,
   wherein the first communication device and the second communication device adopt a wireless Local Area Network (LAN), and
   different frequencies are allocated as the different channels.

7. The wireless station according to claim 4,
   wherein the first communication device and the second communication device are able to be operated in a first mode in which packets having the same content are transmitted at different timings within a predetermined same period and a second mode in which packets having the same content are transmitted within predetermined different periods, and are able to select the first mode and the second mode.

8. The wireless station according to claim 7,
   wherein the first mode and the second mode are selected based on a delay variation of a transmission timing.

9. A mobile object information sharing method of sharing information with another mobile object through wireless communication, the method comprising:
   setting a transmission timing from a second communication device to be later than a transmission timing from a first communication device when the first communication device and the second communication device mounted on a first mobile object and a third communication device and a fourth communication device mounted on a second mobile object are used and the same transmission signals are transmitted to the third communication device and the fourth communication device from the first communication device and the second communication device by using different channels.

10. The mobile object information sharing method according to claim 9,
    wherein a transmission power from the second communication device is set to be higher than a transmission power from the first communication device.

11. The mobile object information sharing method according to claim 9,
    wherein the first communication device to the fourth communication device adopt a wireless Local Area Network (LAN), and
    a first frequency channel is allocated between the first communication device and the third communication device, and a second frequency channel different from the first frequency channel is allocated between the second communication device and the fourth communication device.

12. The mobile object information sharing method according to claim 9,
    wherein the first communication device and the second communication device are able to be operated in a first mode in which packets having the same content are transmitted at different timings within a predetermined same period and a second mode in which packets having the same content are transmitted in predetermined different periods, and are able to select the first mode and the second mode.

13. The mobile object information sharing method according to claim 12,
   wherein the first mode and the second mode are selected based on a delay variation of a transmission timing.

14. The mobile object information sharing method according to claim 9,
   wherein the mobile objects are vehicles moving on a road, and an interval between the first communication device and the second communication device has, as an upper limit, a width dimension of a vehicle which is the first mobile object, and an interval between the third communication device and the fourth communication device has, as an upper limit, a width dimension of a vehicle which is the second mobile object.

15. The mobile object information sharing method according to claim 9,
   wherein the first communication device to the fourth communication device adopt one method selected from a wireless Local Area Network (LAN), a wireless Personal Area Network (PAN), and Dedicated Short-Range Communications (DSRC.

* * * * *